United States Patent Office 3,234,265
Patented Feb. 8, 1966

3,234,265
PROCESS FOR THE MANUFACTURE OF
1-ACETOXY-1,1-DICYANOETHANE
Hans Krekeler, Konigstein, Taunus, and Heinz Späthe and Helmut Gössel, Frankfurt am Main, Germany, assignors to Farbwerke Hoechst Aktiengesellschaft vormals Meister Lucius & Brüning, Frankfurt am Main, Germany, a corporation of Germany
No Drawing. Filed June 11, 1963, Ser. No. 286,948
Claims priority, application Germany, June 14, 1962, F 37,060
12 Claims. (Cl. 260—465.4)

The present invention relates to a process for the manufacture of 1-acetoxy-1,1-dicyanoethane by reacting oximinoacetone with an about equimolecular amount of a dehydrating agent.

1-acetoxy-1,1-dicyanoethane of the formula

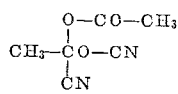

can be prepared in various ways. It can be obtained by reacting 2 mols of ketene with 2 mols of hydrogen cyanide or by reacting 1 mol of acetic anhydride with 2 mols of hydrogen cyanide with the formation of 1 mol of water. Still further, pure acetyl chloride can be transformed with copper cyanide into pyruvic acid nitrile and the nitrile can then be subjected to a long time dimerisation (lasting up to 3 days) whereby it dimerises to 1-acetoxy-1,1-dicyanoethane. All these methods have the disadvantage of being rather expensive because hydrogen cyanide or copper cyanide are used as starting materials.

It has now been found that 1-acetoxy-1,1-dicyanoethane can be prepared in simple manner and without the use of hydrogen cyanide or metal cyanides by reacting oximinoacetone with an about equimolecular amount of a dehydrating agent and a basic catalyst and the 1-acetoxy-1,1-dicyanoethane is isolated, preferably by distillation under reduced pressure. Oximinoacetone is readily accessible in large amounts by allowing nitrous gases to act on acetone. In the reaction according to the invention, one mol of water is split off the oximinoacetone and the dehydration product intermediarily formed is then dimerised under the action of the basic catalyst to 1-acetoxy-1,1-dicyanoethane.

As dehydrating agents there can be used a series of different substances such as phosphorus oxides, thionyl chloride, acetyl chloride, ketene and simple or mixed anhydrides, preferably of low molecular weight aliphatic carboxylic acids. Acetic anhydride is especially suitable because under the action of this dehydrating agent the undesired formation of by-products can be suppressed to a large extent. As noted above, especially suitable anhydrides are those of lower alkyl monocarboxylic acids. The advantageous action of acetic anhydride is based on the fact that the water primarily split off the oximinoacetone is bound so rapidly that it has no possibility to liberate hydrogen cyanide from the intermediary product by hydrolysis. Investigations as to the mode of operation of acetic anhydride revealed that the oximinoacetone is first acetylized and that the acetyl-oximinoacetone then dissociates to pyruvic acid nitrile and acetic acid according to the following formula

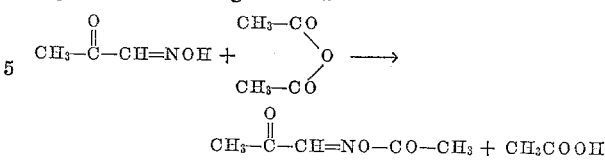

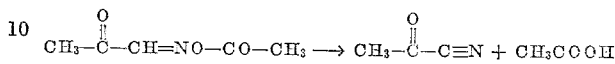

In this reaction free water is not formed. Acetyloximinoacetone is a novel compound which may be isolated in pure form by subjecting the reaction mixture to a distillation under reduced pressure.

The dehydrating agents are preferably used in an about equimolecular amount, calculated on the oximinoacetone used. On principle, it is likewise possible to operate with an excess or a deficiency of dehydrating agent, but this is not very economic.

Suitable catalysts are weakly basic compounds, preferably organic compounds, for example all tertiary amines the nitrogen atom of the amino group of which can be bound in a hydrocarbon chain or as heteroatom in a ring. Suitable tertiary amines in which the nitrogen atom of the amino group is bound in a hydrocarbon chain are derived from primary straight chain or branched alkylamines having 1 to preferably 20 carbon atoms and also from benzyl amine, cyclohexyl amine, aniline, α-naphthyl amine, β-naphthyl amine and low molecular weight homologs of these compounds. In these compounds the hydrogen atoms of the amino group are replaced by identical or different hydrocarbon radicals, especially alkyl groups having 1 to 4 carbon atoms, or by benzyl, cyclohexyl or phenyl radicals. There are mentioned by way of example triethyl amine, diethyl-n-butyl amine, trihexyl amine, 1-dimethyl-aminooctadecane, N-dimethylbenzyl amine, N-diethylcyclohexyl amine, N-dimethyl- and N-diethyl-aniline, N-dimethyl- and N-diethyl-α-naphthyl amine, N-dimethyl- and N-diethyl-β-naphthylamine. Besides the tertiary amino group, the compounds may carry further functional groups. Thus, there may also be used compounds such as 2-acetaminoethanol, N-dimethyl- and N-diethyl-aminoacetic acid and the salts thereof. Suitable amines in which the nitrogen atom of the amino group is bound as heteroatom in a ring are, for example, pyridine and α-, β- and γ-picoline. Furthermore, there can be used triphenylphosphine and other alkylated and arylated phosphines, ammonium salts, for example ammonium acetate and other salts of acetic acid, particularly alkali metal acetates. The compounds specified above can be used either alone or in admixture with one another. N-diethyl-α-naphthyl amine, N-diethyl-β-naphthyl amine, pyridine and triphenylphosphine have proved to be especially advantageous.

The catalysts are used in an amount in the range of from 0.1 to 10% and preferably 1 to 5%, calculated on the weight of the oximinoacetone used.

The reaction is performed at atmospheric pressure at a temperature ranging from 50° C. to the boiling point of the solution. It has been found that the temperature applied has a decisive influence on the dimerisation velocity. The lower the temperature the slower the dimerisation of the acetylcyanide considered as intermediary product to 1-acetoxy-1,1-dicyanoethane. At room temperature the dimerisation of pure acetylcyanide takes about 3 days until good yields are obtained. If, however, a temperature of about 70° C. is applied, better yields are obtained after 45 minutes already. It is surprising that at the higher temperature higher amounts of by-products are not formed as could be expected.

It is advantageous to operate at atmospheric pressure. However, on principle, the reaction can also be carried out under moderately elevated pressure, for example up to 10 atmospheres. In this case, too, reaction temperatures in the range of from 50 to about 130° C. are sufficient.

The process of the invention can be carried out in a manner such that about equimolecular amounts of oximinoacetone and of a dehydrating agent, preferably acetic anhydride, are heated for at least 5 minutes, advantageously 15 to 90 minutes and still more advantageously 30 to 60 minutes under reflux, the reaction mixture is cooled to about 50° C., preferably about 70° C., the basic catalyst is added, the mixture is again heated for at least 5 minutes, suitably for 30 to 90 minutes and still more suitably for 40 to 50 minutes at a temperature in the range of from 50 to 120° C. and preferably 60 to 80° C., and the formed 1-acetoxy-1,1-dicyanoethane is isolated by distillation under reduced pressure. It is surprising that the desired dimerisation takes place already in the strongly diluted acetic acid solution.

Another mode of execution of the process of the invention, according to which in most cases purer products are obtained, consists in heating to boil the mixture of oximinoacetone and the dehydrating agent, especially acetic anhydride, condensing the ascending vapors, adding the catalyst to the distillate obtained and isolating the formed 1-acetoxy-1,1-dicyanoethane by distillation, preferably under reduced pressure. More particularly, about equimolecular amounts of oximinoacetone and acetic anhydride are heated and the products acetyl cyanide, acetic acid and hydrogen cyanide which are formed are continuously recollected in a first receiver heated at 30–50° C. Due to the fact that the receiver is heated, the hydrogen cyanide is at once separated from the distillate and condensed in a second receiver. The catalyst is introduced into the first receiver after the hydrogen cyanide has been distilled off and the mixture is then heated for 30–90 minutes, and preferably about 45 minutes, at about 60–120° C., advantageously about 70° C. The liquid in the first receiver is then subjected to a distillation under reduced pressure whereby acetic acid and 1-acetoxy-1,1-dicyanoethane are obtained in yields of 60–70%, calculated on the oximinoacetone used.

1-acetoxy-1,1-dicyanoethane is an important starting product for the manufacture of the readily polymerizable 1,1-dicyanoethylene (vinylidene cyanide) which, in its polymeric form, is used on a large scale for the manufacture of fibers and synthetic resins.

The following examples serve to illustrate the invention but they are not intended to limit it thereto.

*Example 1*

50 grams of oximinoacetone of 90% strength and 60 grams of acetic anhydride were refluxed for 60 minutes. 4 grams of N-diethyl-α-naphthyl amine were added, the mixture was heated for 50 minutes at 80° C. and distilled under reduced pressure. The 1-acetoxy-1,1-dicyanoethane distilled over at 65° C. under a pressure of 2 mm. of mercury in a yield of 19.6 grams, corresponding to 55% of the theory, calculated on the oximinoacetone used. The product had a melting point of 67° C.

When the reaction of oximinoacetone and acetic anhydride was performed at about 65° C. and the reaction mixture was distilled under reduced pressure, after a first running of acetic acid acetyl-oximinoacetone (boiling point 65° C. under 6 mm. of mercury) was obtained which was purified by fractional distillation.

Analysis.—$C_5H_7NO_3$:

| | Molecular weight | C | H | N | O |
|---|---|---|---|---|---|
| Calculated | 129 | 46.4 | 5.8 | 10.7 | 37.2 |
| Found | 134 | 46.5 | 5.4 | 10.7 | 37.3 |

*Example 2*

50 grams of oximinoacetone of 90% strength were heated with 60 grams of acetic anhydride and the reaction products acetic acid and acetyl cyanide formed were continuously distilled into a first receiver heated at 50° C. The receiver was likewise provided with a distillation bridge over which the hydrogen cyanide was distilled off into a cooled second receiver. 3.4 grams of pure hydrogen cyanide were obtained, corresponding to 23% of the theory, calculated on the oximinoacetone used. The receiver for the hydrogen cyanide was removed. 4 grams of N-diethyl-α-naphthyl amine were added to the distillate in the first receiver consisting of acetic acid and acetyl cyanide. The mixture was heated for 45 minutes at 70° C. and then distilled under reduced pressure. 24.5 grams of 1-acetoxy-1,1-dicyanoethane were obtained, corresponding to 69% of the theory, calculated on the oximinoacetone used. The product had a melting point of 68° C.

In the following table are recited the results of experiments carried out in the manner set forth in Example 2 with the use of equal amounts of different catalysts.

Catalyst: Yield of 1-acetoxy-1,1-dicyanoethane
- Triphenylphosphine _____ 21.5 g.=61%
- 2-acetoaminoethanol _____ 14.8 g.=42%
- N-dimethyl-aniline _____ 15.9 g.=45%
- N-dimethyl-α-naphthylamine _____ 20.1 g.=57%
- N-dimethyl-β-naphthylamine _____ 16.2 g.=46%
- N-dimethylbenzylamine _____ 14.6 g.=42%
- 1-dimethylamino-octadecane _____ 16.2 g.=46%
- Pyridine _____ 24.5 g.=69%

We claim:
1. A process for the manufacture of 1-acetoxy-1,1-dicyanoethane which comprises heating oximinoacetone of the formula $CH_3—CO—CH=NOH$ with an about equimolecular amount of an organic dehydrating agent selected from the group consisting of phosphorus oxides, thionyl chloride, acetyl chloride, ketene and anhydrides of lower alkyl mono-carboxylic acids and 0.1 to 10%, calculated on the weight of oximinoacetone, of an organic weakly basic catalyst selected from the group consisting of tertiary amines, triphenylphosphine, acetaminoethanol, ammonium acetate, alkali metal acetate and mixtures thereof to a temperature in the range between 50° C. and the boiling point of the reaction mixture.

2. The process defined in claim 1, wherein the dehydrating agent is acetic anhydride.

3. The process defined in claim 1, wherein the basic catalyst is a tertiary amine.

4. The process defined in claim 3, wherein the tertiary amine is a lower dialkylated naphthyl amine.

5. The process defined in claim 3, wherein the tertiary amine is pyridine.

6. The process defined in claim 1, wherein the basic catalyst is triphenylphosphine.

7. The process defined in claim 1, wherein the basic catalyst is acetaminoethanol.

8. The process defined in claim 1, wherein 1–5% of catalyst are used.

9. The process defined in claim 1, wherein the reaction is carried out at a temperature in the range of from 70° C. to the boiling point of the reaction mixture.

10. The process defined in claim 1, which comprises heating to a boil the mixture of oximinoacetone and the dehydrating agent, cooling the mixture to at most 50° C., adding the catalyst to the cooled mixture, heating the mixture for at least 5 minutes at a temperature in the range of from 50 to 120° C. and isolating the 1-acetoxy-1,1-dicyanoethane by distillation under reduced pressure.

11. The process of claim 1, which comprises heating to a boil the mixture of oximinoacetone and dehydrating agent, distilling off and condensing the vapors, adding the catalyst to the distillate and isolating the 1-acetoxy-1,1-dicyanoethane by distillation under reduced pressure.

12. A process for the manufacture of 1-acetoxy-1,1-dicyanoethane which comprises reacting oximinoacetone of the formula $CH_3—CO—CH=NOH$ with about equimolecular amounts of acetic anhydride and 0.1 to 10%, calculated on the weight of oximinoacetone, of a basic catalyst selected from the group consisting of tertiary amines, triphenylphosphine, acetaminoethanol, ammonium acetate, alkali metal acetate and mixtures thereof at a temperature in the range of from 70° C. to the boiling point of the solution and isolating the 1-acetoxy-1,1-dicyanoethane by distillation under reduced pressure.

No references cited.

CHARLES B. PARKER, *Primary Examiner.*

JOSEPH BRUST, *Examiner.*